United States Patent [19]

Blehm et al.

[11] Patent Number: 4,631,273

[45] Date of Patent: Dec. 23, 1986

[54] AQUEOUS EMULSIONS USING CATIONIC SILANES

[75] Inventors: Lynne Blehm; James R. Makek; W. Curtis White, all of Midland, Mich.

[73] Assignee: Dow Corning Corporation, Midland, Mich.

[21] Appl. No.: 668,047

[22] Filed: Nov. 5, 1984

[51] Int. Cl.$^4$ .................... A01N 63/02; A61K 31/71; B01J 13/00

[52] U.S. Cl. ...................... 514/29; 106/271; 106/287.11; 106/287.12; 252/311.5; 252/312; 252/522 R; 514/938; 514/939

[58] Field of Search ............... 252/312, 311.5, 522 R; 106/287.11, 287.12, 271; 524/864; 556/413; 514/29, 938, 939

[56] References Cited

U.S. PATENT DOCUMENTS

| | | | |
|---|---|---|---|
| 2,715,133 | 8/1955 | Speier | 556/413 |
| 3,557,178 | 1/1971 | Gölitz et al. | 556/413 |
| 3,576,779 | 4/1971 | Holdstock et al. | 106/287.11 X |
| 3,700,844 | 10/1972 | Domba | 252/363.5 X |
| 3,734,763 | 5/1973 | Plueddemann | 556/413 X |
| 3,737,336 | 6/1973 | Golitz et al. | 106/287.11 X |
| 3,852,075 | 12/1974 | Basadur | 106/287.11 X |
| 3,971,883 | 7/1976 | Meeks et al. | 106/287.11 X |
| 4,035,411 | 7/1977 | Heckert et al. | 556/413 |

FOREIGN PATENT DOCUMENTS 686068  1/1953  United Kingdom .

*Primary Examiner*—Richard D. Lovering
*Attorney, Agent, or Firm*—Christopher E. Blank

[57] ABSTRACT

What is disclosed are aqueous emulsions which are formed by the use of certain organofunctional cationic silanes. The emulsions are stable and are formed using reactive silanes that allow the transfer of water immiscible liquids and the silanes to certain substrates with the avoidance of any subsequent re-wetting or re-solubilizing of the silane or water immiscible liquid, and subsequent loss from the surface thereof.

80 Claims, No Drawings

AQUEOUS EMULSIONS USING CATIONIC SILANES

BACKGROUND OF THE INVENTION

This invention relates to new aqueous emulsions which are prepared by the use of certain organofunctional cationic silanes and water immiscible liquids.

There is a great deal known about the effects of using organic cationic compounds to prepare aqueous emulsions. It is known for example that only certain organic cationic compounds are useful in this regard and the literature is saturated with reports of experiments where researchers have successfully paired certain cationic emulsifiers with certain immiscible organic liquids to form stable emulsions in water. The end uses for such combinations are many and varied and run all the way from hair treatments to solvent transport. For example, U.S. Pat. No. 4,272,395, issued June 9, 1981 shows the use of, for example, didecyldimethylammonium chloride, in conjunction with certain other surfactants, to give germicidal detergents for use in manual dishwashing while Wang, L. K. discloses cetyldimethylbenzylammonium chloride as a bacteriocidal cationic surface active agent in solution (IND. ENG. CHEM., Prod. Res. Dev., vol. 14, No. 4, 1975).

Organic cationic emulsifiers have also been successfully used in conjunction with oxyalkylene containing organopolysiloxanes (nonionic surfactants), in hair preparations, Japanese Kokai 80/108811 (Application No. 14560/79, filed Feb. 10, 1979).

Certain other silicon containing surface active agents have been developed. For example, U.S. Pat. No. 4,093,642, issued June 6, 1978, discloses ion-pair-containing siloxane compounds that are insensitive to pH changes and therefore remain stable in solution even though the pH of the solution changes. Such materials have been described as the reaction product of metathesis reactions between metallic salts of anionic silicone or organic surface-active compounds and halide salts of quaternary ammonium silicone or organic surface-active compounds. An example of such a material is

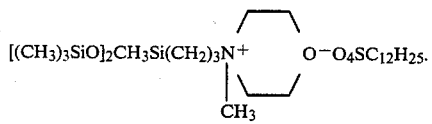

Further, Domba, in U.S. Pat. No. 3,700,844, issued Oct. 24, 1972, discloses perfluoroalkyl organosilicon compounds as dispersants for liquid or solid substances normally insoluble in water. It is alleged by Domba that water-in-oil type emulsions are prepared by the use of such compounds. Finally, silanes having the general formula

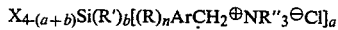

are disclosed in Canadian Pat. No. 860,936, issued Jan. 12, 1971.

Silicon containing surfactants wherein the molecules are primarily silanes, have been disclosed by Maki et al in Japanese Patent Application 45/83950 (Publication No. 50-35062). Such silanes are described as having the general formula $R'_3SiR^2NR^3R^4R^5 X$ wherein $R'$ is a $C_{1-4}$ alkyl group; $R^2$ is a $C_{1-4}$ linear or branched alkylene group; $R^3$, $R^4$ and $R^5$ are hydrogen or $C_{1-4}$ alkyl; X is halogen. These materials are described as having germicidal and sterilizing activities. It should be noted that these materials are not alkoxy-functional and therefore, they have the properties that allow them to be resolubilized upon their contact with water, thus differing from the materials of the instant invention.

Maki et al extend their technology disclosure in Yukagakv, Vol. 19, No. 4 (1970) pp 51–57 by illustrating surfactants having the general formula

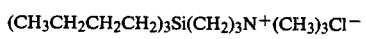

and

which, it should be noted, are also non-alkoxy functional and therefore suffer from the same disadvantages as the materials of the Maki disclosure, Supra.

THE INVENTION

It has now been found that certain alkoxyfunctional cationic silanes, not containing the expensive perfluoroalkyl group, can be utilized to prepare stable emulsions which can be used as storage, transfer and delivery media for water immiscible liquids. Such silanes have the unique property of transferring the immiscible liquids and the cationic silanes to certain substrates with the avoidance of subsequent re-wetting or resolubilizing of the silane or immiscible liquid and subsequent loss of the same from the substrate thereof. The emulsions can be used on a substrate to transfer the beneficial properties of the cationic silane to the substrate rather than the properties of the immiscible liquid. An example of this aspect of the invention would be the use of small amounts of polydimethylsiloxane oils in an aqueous oil-in-water emulsion along with a cationic silane, such as, $(CH_3O)_3Si(CH_2)_3N^+(CH_3)_2C_{18}H_{37}Cl^-$, in order to render the surface of the substrate antimicrobially active, with the concomitant benefit of durable antimicrobial activity on the substrate and, the benefit of non-rewetting or non-resolubilizing of the cationic silane to prevent its removal from the substrate.

The invention therefore consists of an aqueous oil in water emulsion comprising (a) water, (b) a water immiscible liquid, and (c) a cationic silane having the general formula

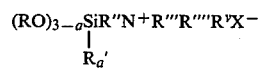

wherein R is an alkyl radical of 1 to 4 carbon atoms or hydrogen; a has a value of 0, 1 or 2; R' is a methyl or ethyl radical; R" is an alkylene group of 1 to 4 carbon atoms; R''', R'''' and R$^v$ are each independently selected from a group consisting of (i) saturated or unsaturated hydrocarbon radicals containing 1 to 18 carbon atoms and (ii) saturated and unsaturated organic radicals consisting of carbon, hydrogen and oxygen; carbon, hydrogen and sulfur; and carbon, hydrogen and nitrogen; the total number of carbon atoms from R''', R'''' and R$^v$ in each of (i) and (ii), must be equal to or greater than twelve carbon atoms and X is selected from a group consisting of chloride, fluoride, bromide, iodide, acetate and tosylate.

What is meant by "water immiscible liquid" is that the liquids of component (b) of this invention cannot be completely soluble in water.

For purposes of this invention, R can be an alkyl radical of 1 to 4 carbon atoms or hydrogen. Thus, R can be methyl, ethyl, propyl or butyl, or hydrogen. The value of a is 0, 1 or 2. This definition gives rise to cationic silanes such as

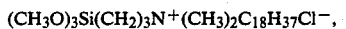
(CH$_3$O)$_3$Si(CH$_2$)$_3$N$^+$(CH$_3$)$_2$C$_{18}$H$_{37}$Cl$^-$,

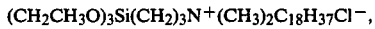
(CH$_2$CH$_3$O)$_3$Si(CH$_2$)$_3$N$^+$(CH$_3$)$_2$C$_{18}$H$_{37}$Cl$^-$,

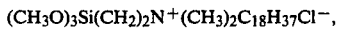
(CH$_3$O)$_3$Si(CH$_2$)$_2$N$^+$(CH$_3$)$_2$C$_{18}$H$_{37}$Cl$^-$,

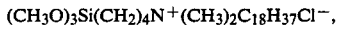
(CH$_3$O)$_3$Si(CH$_2$)$_4$N$^+$(CH$_3$)$_2$C$_{18}$H$_{37}$Cl$^-$, and

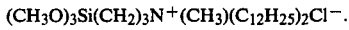
(CH$_3$O)$_3$Si(CH$_2$)$_3$N$^+$(CH$_3$)(C$_{12}$H$_{25}$)$_2$Cl$^-$.

The methods of preparation of the cationic silanes are well known in the art and it is believed that it is not necessary to incorporate those teachings herein.

The cationic silanes can be used to prepare the emulsions of this invention in essentially a concentrated form i.e. neat, or they can be diluted with water, water miscible solvents or water immiscible solvents, before use.

The water immiscible liquids used in this invention are usually organic compounds and such compounds can be the primary ingredient in the emulsion, that is, one may wish to deliver the immiscible liquid to a substrate to derive benefits therefrom or, the cationic silane itself may be the primary ingredient in the emulsion, that is, one may wish to deliver the cationic silane to a substrate to derive the benefits therefrom. The water immiscible liquids used in this invention can therefore be selected from silicone oils, such as Dow Corning ® 200 fluids, manufactured by the Dow Corning Corporation, Midland, Michigan USA, which are trimethylsiloxy endblocked polydimethylsiloxanes; cyclic siloxanes such as dimethylsiloxane cyclic tetramer; phenylmethyl fluids such as linear polyphenylmethylsiloxanes such as those currently used in personal care products; mineral oils; petroleum lights; petroleum crude oils; pitch; tars; ethylene, propylene and butylene glycols and their copolymers ("polyglycols"); solvents; fatty acids; fatty acid derivatives such as esters; fatty alcohols; antibiotics; vegetable oils; resins, both natural and synthetic; waxes and waxy polymers and the like; emollients, creams, salves, medicaments, drugs and so forth. The wax may be an animal wax such as beeswax, lanolin, spermaceti or whale oil; a vegetable wax such as candellila, sugar cane or jojoba; a fossil mineral wax such as montan, ozokerite or Utah wax; a hydrocarbon wax such as petrolatum or paraffin; or a microcrystalline or synthetic wax such as gersthofen wax, acrowax, opalwax, cardis or Carbowax. The fatty acid may be stearic, oleic or myristic acid. The fatty acid ester may be a monoester of a polyhydric alcohol ester, such as a methyl ester, or methyl myristate or stearate. The fatty alcohol may be lauryl, myristyl, cetyl, oleyl or steryl alcohol. The antibiotic may be erythromycin or acromycin. The vegetable oil may be peanut or sesame oil. The organic solvent may be octanol, Stoddard solvent or Chlorothene.

Preferred for this invention are mineral oil and those siloxanes which are low molecular weight cyclics and polysiloxanes having the general formula

R'$_3$SiO(R''$_2$SiO)$_w$(R'''QSiO)$_z$SiR'$_3$ and (R'R''SiO)$_y$ wherein R' is an alkyl radical of 1 to 3 carbon atoms, phenyl, an alkoxy radical having the formula R''''O—, wherein R'''' is an alkyl radical of 1 to 4 carbon atoms or hydrogen; R'' is an alkyl radical of 1 or 2 carbon atoms or the phenyl group; R''' has the same meaning as R''; Q is a substituted or unsubstituted radical composed of carbon and hydrogen, or carbon, hydrogen and oxygen, or carbon, hydrogen and sulfur, or carbon, hydrogen and nitrogen; w has a value of from 1 to 500; z has a value of 1 to 25 and y has a value of 3 to 5.

For purposes of this invention, the term "polyglycol" shall mean not only the ethylene, propylene and butylene glycols and their copolymers but the term shall encompass both ether capped and ester capped versions and, the term shall also mean the polyhydric alcohols such as dipropylene glycol, glycerol, sorbitol and the like.

The method of preparation of the emulsions is any conventional method by which emulsions are typically made. For example, the water, the water immiscible liquid and the cationic silane are mixed together in a simple mixture and the mixture is subjected to a shear force by passing the mixture 2 or 3 times through a homogenizer with adjustable shear force. The emulsions of this invention as set forth in the examples were prepared on a homogenizer wherein the shear was greater than about 1000 psi.

It should be noted that the emulsions prepared using the cationic silanes in this invention are oil-in-water type emulsions. Some water-in-oil type products are prepared in the initial stages of homogenization during manufacture of the emulsions of this invention but these emulsions soon invert and become oil-in-water type emulsions.

It should be further noted that in some cases where it is desired to optimize the emulsion product, certain co-surfactants may be used in the preparation of the emulsions of this invention. For example, useful co-surfactants are other cationic surfactants and nonionic surfactants. Anionic surfactants can be used in this invention but if anionic surfactants are used they must be neutralized or, larger amounts of the cationic silanes of this invention must be used.

Useful surfactants include other cationics such as Arquad T27W (trimethyl tallow ammonium chloride) manufactured by Armak, Inc., McCook, Ill. U.S.A.; and Mirapol A-15 (polyquaternary ammonium chloride) manufactured by Miranol Chemical Co. Inc., Dayton, N.J., U.S.A.; nonionics such as Tergitol ® 15-S-3, manufactured by Union Carbide Corp., Danbury, Conn.; Brij 78 Stearth-2, manufactured by ICI, Americas, Inc., Wilmington, Del., USA; and Triton ® X-100 (alkylarylpolyether alcohol) manufactured by Rohm and Haas, Philadelphia, Pa.; amphoterics such as LONZAINE C (cocamide propyl betaine) manufactured by LONZA, Inc., Fairlawn, N.J. and anionics such as Hampshire DEG (sodium dihydroxyethylglycinate, manufactured by W. R. Grace, Nashua, N.H., U.S.A.; Emersol 6400 (sodium lauryl sulfate) manufactured by Emery Industries, Inc., Linden, N.J., USA; and Standopol A (ammonium lauryl sulfate) manufactured by Henkel, Inc., Teaneck, N.J., U.S.A.

It should also be noted that the silanes of this invention retain the alkoxy functionality while in the emulsion so that when the cationic silane, in emulsion form, is laid out on a substrate, the alkoxy groups will hydrolyze and the silane will bond to the substrate. In other words, it is theorized that the silane does not lose its ability to bond to the substrate because the alkoxysilanes do not completely hydrolyze in the emulsion and the silane cannot polymerize to an insoluble siloxane.

The mixture of components (a), (b), and (c), and optionally a co-surfactant, are subjected to a shear force in order to form the emulsion. This can be carried out by using conventional apparatus such as a Manton-Gaulin 15M8BA homogenizer.

It has been found that the shear force using an Eppenbach mixer is not the desired method for applying shear force herein as that apparatus does not appear to have quite enough shear force to enable the manufacture of commercially acceptable emulsions.

As indicated earlier, one major benefit in the use of these emulsions is the fact that either one or both of the major components of the emulsion can be laid out on a substrate. Once the emulsion breaks and dries down, the cationic silane is no longer available to the system as an emulsifier and therefore, the immiscible liquid on the surface cannot be re-wet or re-solubilized by the application of water, with subsequent removal from the substrate. This "unavailability" of the cationic silane may be due to its bonding to the substrate or, it may be due to hydrolysis and polymerization of the cationic silane, on the surface, to a highly crosslinked, insoluble siloxane resin, or a combination of both. The immiscible liquid, of course, will generally remain on the substrate owing to its immiscibility with water. Obviously, the water immiscible liquid could be removed by solvent washing or an aqueous surfactant system or could be removed by general wear of the substrate.

Another benefit of this invention is the use of water rather than solvents to carry the cationic silanes and water immiscible solids. A further advantage of this system is the ability to dissolve solvent soluble materials in a small amount of solvent and emulsify the solvent and solvent soluble material using a cationic silane such that solvent soluble materials can be obtained in a nearly total aqueous system with only a small amount of solvent present.

For purposes of this invention, the components are present such that there is at least 0.1 to 38 weight percent of the cationic silane; 0.1 to 84 weight percent of the immiscible liquid and 4.9 to 99.8 weight percent of water based on the total weight of all three components.

Preferably, the components are present at about 0.5 to 5.0 weight percent of the cationic silane; 5 to 60 weight percent of the immiscible liquid and the remainder water. Most preferred is about 0.5 to 2.0 weight percent of the cationic silane; 10–60 weight percent of the immiscible liquid and, the remainder water. In those cases where a small amount of solvent is necessary to dissolve solid materials, up to about 10 weight percent of the total emulsion can be solvent.

So that those skilled in the art can appreciate the extent of the instant invention, the following examples are included.

The stability of the emulsions of the invention and those comparative emulsions outside the instant invention were measured by an initial stability; by accelerated aging tests, and by freeze thaw cycling tests.

Accelerated Aging

Thermal stability and accelerated shelf life was tested by placing samples in 2 oz. tall glass bottles and placing in a 40° C. oven. Samples were observed periodically and removed upon failure. Failure was determined by any physical change such as layer separation, creaming or gelling. The number of hours or days of stability are reported.

Freeze/Thaw Stability

Samples were placed in 2 oz. tall glass bottles. The bottled samples were placed in a −20° C. freezer at 2 P.M. daily, left overnight and removed at 8 A.M. the following morning. The samples thawed at room temperature until 2 P.M. when they were returned to the freezer. Observations were made prior to return to the freezer. Failure was determined by any physical change such as layer separation, creaming, gelling, etc. One freeze and one thaw constitutes one cycle. The results are reported in the number of cycles passed.

Microscopic Examination

Visual examination of several emulsions on a microscope calibrated to measure particles in the one micron range was done. Few agglomerates were present in any of the emulsions. Micelle diameter ranged from less than one micron to one micron with a few larger particles present.

All viscosities reported in the examples are reported at 25° C. unless stated otherwise. The foam tests herein were carried out using ASTM 1173. Silanes used in the examples were 42 weight % methanol solutions unless indicated otherwise in the Examples. Arquad T27W is a 27 weight % aqueous solution unless otherwise indicated in the Examples.

EXAMPLE 1

Preparation of an Aqueous Siloxane Fluid Emulsion Using a Cationic Silane

A cationic silane of this invention was used to prepare a room temperature aqueous emulsion from a 20 cs polydimethylsiloxane having trimethylsiloxy endblocks.

The emulsion was prepared by combining 48 ml of a 42 weight percent methanol solvent solution of $(CH_3O)_3Si(CH_2)_3N^+(CH_3)_2C_{18}H_{37}Cl^-$ with 100 ml of the above-described siloxane fluid and 852 ml of distilled water. This mixture was prepared by adding the silane to the water; adding the siloxane to the water/silane mixture and passing the entire mixture through a Manton-Gaulin 15M8BA homogenizer at a setting of 6000 psi, two times. A creamy-white emulsion was formed. The emulsion was subjected to a centrifugation for thirty minutes at 3000 RPM but no separation occurred. It should be noted that this emulsion did not separate upon standing on the shelf for at least a period of twenty-four hours. It should also be noted that the water immiscible liquid was present at 10 weight percent in the emulsion.

EXAMPLE 2

Mineral oil in emulsion using a silane of this invention.

An aqueous emulsion was prepared using a cationic silane of this invention and a white mineral oil, Klearol, manufactured by Witco Chemical Co., New York, N.Y. U.S.A.

The emulsion was prepared by combining the silane $(CH_3O)_3Si(CH_2)_3N^+(CH_3)_2C_{18}H_{37}Cl^-$ at 42 weight percent solids in methanol, with distilled water and the mineral oil. Thus, fifteen gms of the silane in methanol was combined with 750 gms of distilled water and then 235 gms of mineral oil was added. The entire mixture was passed twice through the homogenizer described in Example 1 at a setting of 6000 psi. The result was a creamy-white emulsion which was stable on the shelf for at least 24 hours.

EXAMPLE 3

Example 1 was repeated except that the quantity of twenty centistoke immiscible liquid was increased to sixty weight percent in the emulsion. Thus, twenty gms of $(CH_3O)_3Si(CH_2)_3N^+(CH_3)_2C_{18}H_{37}Cl^-$ were mixed with 380 gms of distilled water and then there was slowly added 600 gms of the polydimethylsiloxane as described in example 1. The entire mixture was passed twice through the Manton-Gaulin set at 6000 psi. The result was a creamy-white emulsion which did not separate for at least twenty-four hours on the shelf and which did not separate upon centrifugation.

EXAMPLE 4

Example 3 was repeated except that the immiscible liquid was one in which the viscosity was three hundred and fifty centistokes. The resulting emulsion was creamy-white and stable for at least twenty-four hours on the shelf and it was also stable upon centrifugation.

EXAMPLE 5

Example three was repeated except that the immiscible organic liquid was one in which the viscosity was one thousand centistokes. The resulting emulsion was stable to centrifugation. At about twenty hours, the emulsion destabilized on the shelf, separating into two noticeable layers, a creamy top and a milky bottom. The emulsion was easily reestablished by hand-shaking the bottle containing the emulsion.

EXAMPLE 6

An emulsion was prepared by combining 48 gms of the 42 weight percent in methanol silane of Example 1, with 852 gms of water and then 100 gms of the immiscible liquid of Example 4. The entire mixture was passed twice through the Manton-Gaulin set at 6000 psi. The initial emulsion looked very good but after standing about twenty hours on the shelf, the emulsion separated into two layers wherein the top layer was creamy and the bottom layer was milky. The product was easily re-emulsified by hand-shaking the bottle which contained the product.

EXAMPLE 7

An emulsion was prepared from the silane of Example 1 and a polydimethylsiloxane which was a cyclic tetramer, i.e., $[(CH_3)_2SiO]_4$. Thus, 48 gms of the silane as used in Example 1 was added to 852 gms of distilled water and then 100 gms of the cyclic tetramer siloxane was added. The entire mixture was passed twice through the Manton-Gaulin set at 6000 psi.

The result was a stable emulsion which was stable for at least twenty-four hours on the shelf.

EXAMPLE 8

An emulsion was prepared as in Example 7 with the exception that the quantity of cyclic tetramer was increased. Thus, twenty gms of the silane were mixed with 400 gms of distilled water and then 580 gms of cyclic tetramer was added. The entire mixture was passed through the Manton-Gaulin set at 6000 psi and there resulted a good emulsion. It was very thick and non-slumping. Upon standing for sixteen hours, the emulsion was still very thick but it was more fluid-like than it had been at the incipient stage.

EXAMPLE 9

Several emulsions were prepared and compared using a commercially available organic quaternary amine as the surfactant. These emulsions were prepared according to the general procedure set forth in Examples 1 to 8. The commercial surfactant used was Arquad T27W by Armak Company, McCook, Ill., U.S.A. which has a structure similar to the silane of Example 1 except that it contains no silicon atoms and therefore, no alkoxy groups bound to silicon atoms. The formulations can be found in Table I below.

TABLE I

Formulations From Example 9

| Sample | Immiscible Organic Liquid | Gms | 27% Active Arquad/ Gms | $H_2O$ Gms | Results |
|---|---|---|---|---|---|
| A | Mineral Oil | 235 | 23.3 | 750 | Stable (24 hrs.) |
| B | PDMS I 20 cs | 600 | 31.1 | 380 | Stable (24 hrs.) |
| C | PDMS I 350 cs | 600 | 31.1 | 380 | Stable (24 hrs.) |
| D | PDMS I 350 cs | 100 | 74.0 | 852 | At 1 hour, 1" of white layer at top |
| E | PDMS I 1000 cs | 600 | 31.1 | 380 | 5" of white layer at 1 hour, on top |
| F | PDMS II | 580 | 31.1 | 400 | Stable (24 hrs.) |
| G | PDMS II | 100 | 74.0 | 852 | At 3 days, 1" white layer on top |

PDMS I is trimethylsiloxy endblocked polydimethylsiloxane
PDMS II is $[(CH_3)_2SiO]_4$ Results from the above can be compared generally to the results from the example of this invention in the following manner.

| | |
|---|---|
| Sample A of Example 9 and Example 2. | Sample E of Example 9 and Example 5. |
| Sample B of Example 9 and Example 3. | Sample D of Example 9 and Example 6. |
| Sample C of Example 9 and Example 4. | Sample G of Example 9 and Example 7. |
| Sample F of Example 9 and Example 8. | |

EXAMPLE 10

Two emulsions were prepared at two different levels of silane. The silane used was $(CH_3O)_3Si(CH_2)_3N^+(CH_3)_2C_{18}H_{37}Cl^-$. The formulations are set forth below and the emulsification was carried out using the Manton-Gaulin at 6000 psi.

TABLE II

| Sample | Silane Gms | Immiscible Liquid/gms | $H_2O$ Gms | Result |
|---|---|---|---|---|
| A | 11.9 of 42% Solution | PDMS I, 20 cs/588 | 400 | Good Emulsion Shelf Stable at 24 hrs. |
| B | 71.0 of 70% Solution | PDMS I, 20 cs/529 | 400 | Good Emulsion Shelf Stable at 24 hrs. Slight Yellow Color |

EXAMPLE 11

Several emulsions were prepared and evaluated for accelerated shelf aging. Their formulations can be found in Table III. $(CH_3O)_3Si(CH_2)_3N^+(CH_3)_2C_{18}H_{37}Cl^-$ was used in all cases in this example at 42% solids in methanol. Arquad T27W was used for comparison purposes and is not part of this invention.

TABLE III

Formulations From Example 11

| Sample | Gms. Silane | Gms Arquad At 27% Solids | Gms H$_2$O | Gms/Immiscible Liquid | Results At Day 66 |
|---|---|---|---|---|---|
| A | 15 | — | 750 | 235 Mineral Oil | No Separation, Stable |
| B | 20 | — | 380 | 600 PDMS I, 20 cs | No Separation, Stable |
| C | — | 23.3 | 750 | 235 Mineral Oil | No Separation, Stable |
| D | 20 | — | 400 | 580 PDMS II | Slight (⅛") layer at day 11, stable thereafter |
| E | — | 31.1 | 380 | 600 PDMS I, 20 cs. | No Separation, Stable |
| F | — | 31.1 | 400 | 580 PDMS II | At day 11 ½" layer on top, stable thereafter |
| G | 11.9 | — | 400 | 588 PDMS I | No Separation, Stable |
| H | 71.0 (70% Solids) | — | 400 | 529 PDMS I, 20 cs | No Separation, Stable |

EXAMPLE 12

Some emulsions were prepared and were used to treat filter paper in order to test the materials for zone of inhibition. Standard zone of inhibition testing was done using AATCC Test Method 147-1977.

Samples of the paper (#1 Whatman filter paper) were soaked in the emulsions for 20 minutes and then removed and air-dried with the use of suction vacuum, followed by three water rinses and drying in an oven at 100° C. for 20 minutes. The results can be found on Table IV.

TABLE IV

| Sample | Zone of Inhibition in mm |
|---|---|
| Example 11, B | 0 |
| Example 11, C | 1 |
| Example 11, D | 0 |
| Example 11, E | 1 |
| Example 11, F | 1 |
| Example 11, G | 0 |
| Example 11, H | 0 |
| Example 9, D | 1 |
| Example 4 | 0 |
| Example 9, A | 1 |
| Example 9, C | 1 |
| Example 5 | 0 |
| Example 9, E | 1 |

EXAMPLE 13

Several emulsions were tested for freeze-thaw stability. The cycle was 18 hours frozen and 6 hours thaw. The results can be found on Table V.

TABLE V

Results of Freeze-Thaw Testing

| Sample | 1 | 2 | 3 | 4 | 5 | 6 |
|---|---|---|---|---|---|---|
| Example 2 | passed | failed | — | — | — | — |
| Example 9A | passed | failed | — | — | — | — |
| Example 10A | passed | failed | — | — | — | — |
| Example 10B | passed | passed | passed | passed | passed | passed |
| Example 3 | passed | passed | passed | passed | passed | passed |
| Example 9B | passed | passed | failed | — | — | — |
| Example 8 | passed | passed | passed | passed | passed | passed |
| Example 9F | passed | passed | passed | passed | passed | passed |

EXAMPLE 14

Several emulsions with increased silane content and difficult-to-emulsify immiscible liquids were prepared and subjected to freeze-thaw testing. The silane used was $(CH_3O)_3Si(CH_2)_3N^+(CH_3)_2C_{18}H_{37}Cl^-$. A commercial surfactant, Arquad T27W was used for comparison purposes and does not fall within the scope of the present claims. The formulations and results can be found in Table VI. P=Passed; F=Failed.

TABLE VI

Formulations From Example 14

| Sample | Gms Silane | Gms Arquad | Gms H$_2$O | Gms/Organic Liquid | 1 | 2 | 3 | 4 | 5 | 6 |
|---|---|---|---|---|---|---|---|---|---|---|
| A | 142.8 | — | 400 | 500 PDMS I, 20 cs | P | P | P | P | P | P |
| B | — | 18.5 | 394 | 588 PDMS I, 20 cs | F | — | — | — | — | — |
| C | — | 370 | 170 | 460 PDMS I, 20 cs | P | P | P | P | — | — |
| D | — | 74 | 326 | 600 Stoddard Solvent | P | P | P | P | — | — |
| E | 8.6 | — | 120 | 180 Stoddard Solvent | F | — | — | — | — | — |
| F | — | 74 | 326 | 600 Chlorothene ® | F | — | — | — | — | — |
| G | 8.6 | — | 120 | 180 Chlorothene ® | F | — | — | — | — | — |
| H | 286 | — | 314 | 400 PDMS I, 20 cs | P | P | P | P | — | — |

Chlorothene ® is a registered trademark of The Dow Chemical Company, Midland, Mich. U.S.A., for inhibited 1,1,1,trichloroethane.

EXAMPLE 15

Several emulsions were prepared using perfume oils as the immiscible organic liquid. The perfume oils were obtained from Givaudan Clifton, N.J., U.S.A. and were designated as 6501, 6502, 6503 and 6504. The first eight samples on Table VII were hand homogenized and the remaining three samples on Table VII were homogenized by the Manton-Gaulin set at 6000 psi. Thus, it is apparent that the perfume oils are readily homogenized. Further it should be noted from the Table VII results that the oils could not be emulsified when present in high concentrations, even when the silane emulsifier was increased in the emulsion. Successful emulsions were obtained at lower concentrations of the perfume oils. The silane used in this example was $(CH_3O)_3Si(CH_2)_3N^+(CH_3)_2C_{18}H_{37}Cl^-$.

TABLE VII

Perfume Oil Formulations

| Sample | Gms Silane | Gms H$_2$O | Gms/Oil | Shelf Stable Emulsion |
|---|---|---|---|---|
| A | 2 | 96 | 2 6501 | Yes |
| B | 2 | 96 | 2 6502 | Yes |
| C | 2 | 96 | 2 6503 | Yes |
| D | 2 | 96 | 2 6504 | Yes |
| E | 20 | 60 | 20 6501 | No |
| F | 20 | 60 | 20 6502 | No |
| G | 20 | 60 | 20 6503 | No |
| H | 20 | 60 | 20 6504 | No |
| I | 20 | 960 | 20 6504 | Yes |
| J | 20 | 60 | 20 6501 | No |

EXAMPLE 16

One of the advantages of the emulsions prepared by this invention is the fact that once the emulsion is laid-down, and broken, the silane emulsifier attaches to the substrate. Thus, it is unavailable for re-wetting or re-solubilization purposes and the immiscible organic liquid that has been carried to the substrate cannot be re-emulsified and lifted from the surface by the application of water.

Thus, two inventive emulsions and two control emulsions were prepared using the formulations found in Table VIII. The results can be found on Table IX. The silane emulsifier used in this example was $(CH_3O)_3Si(CH_2)_3N^+(CH_3)_2C_{18}H_{37}Cl^-$. Arquad T27W was the control emulsifier.

TABLE VIII

Formulations From Example 16

| Sample | Gms Silane | Gms Arquad | Gms H$_2$O | Gms/Oil |
|---|---|---|---|---|
| A | 20 | — | 380 | 600 PDMS II |
| B | — | 20 | 380 | 600 PDMS II |
| C | 20 | — | 380 | 600 PDMS I |
| D | — | 20 | 380 | 600 PDMS I |

Silane is 20 gms. active material from 47.6 gms. of 40% solids solution. Arquad is 20 gms. active material from 74 gms. of 27% solids solution.

The emulsions were placed in open top aluminum pans, placed in an oven and heated to slowly dry the emulsions to a solid film without crosslinking or curing them. After drying, water was added to the films in the aluminum pans in an attempt to resolubilize the films.

TABLE IX

Results of Attempted Re-Solubilization

| Sample | Results |
|---|---|
| A | No solubilization. The film was soft and was mucosic, brain-like material |
| B | Some of the film re-dispersed in the water |
| C | No solubilization. The oil and the water were in two separate layers |
| D | Some of the oil re-dispersed in the water |

When bromphenol blue was added to Samples B and D, the aqueous phase showed a blue color, indicating that the Arquad was in that phase and had resolubilized.

When bromphenol blue was added to Samples A and C, no blue color was observed in the aqueous phase, indicating that none of the silane emulsifier resolubilized in the water. Further, in Sample A, it was obvious that the silane emulsifier had migrated to the insoluble mucosic material as shown by the blue-colored veins throughout the material. In Sample C, the aluminum pan walls were blue indicating that the silane emulsifier had migrated to the pan wall and was no longer available for re-emulsifying the oil and water.

EXAMPLE 17

Preparation of an emulsion using $(CH_3O)_3Si(CH_2)_3N^+(CH_3)_2C_{18}H_{37}Cl^-$ An aqueous emulsion was prepared using the above-identified silane and PDMS I at 20 cs. Thus, five hundred and eighty gms of the PDMS I were added to a mixture of 20 gms of the silane in 400 gms of water. This entire mixture was emulsified using a hand emulsifier. Four passes through the emulsifier gave a uniform, creamy-white emulsion which was shelf stable for several weeks.

EXAMPLE 18

Several emulsions were prepared in which the type of silane was varied. Several comparison silanes were also evaluated that are "quaternary silanes", but which fall outside the scope of this invention. Mixtures were prepared using simple mixing techniques. Each emulsion contained mineral oil, the silane and water. Thus, x gms of silane were mixed with 80 gms of distilled water and 110 gms of white mineral oil and hand emulsified by passing twice through a hand homogenizer. The stability referred to in the "results" column means at least 24 hours shelf stability. The formulations and results can be found on Table X. A and B are within the scope of this invention, C through F are not.

TABLE X

Formulation and Results From Example 18

| Sample | Formula of Silane/Gms | Result |
|---|---|---|
| A | $(CH_3O)_3Si(CH_2)_3N^+(CH_3)_2C_{18}H_{37}Cl^-/3.8$ | Stable Emulsion |
| B | $(CH_3CH_2O)_3Si(CH_2)_3N^+(CH_3)_2C_{18}H_{37}Cl^-/4.0$ | Stable Emulsion |
| C | $(CH_3O)_3Si(CH_2)_3N^+(CH_2CH_3)_3Cl^-/3.8$ | No Emulsion |
| D | $(CH_3O)_3Si(CH_2)_3N^+(CH_2CH_2)_3NCl^-/4.0$ | No Emulsion |
| E | $(CH_3O)_3Si(CH_2)_3N^+(CH_3)_3Cl^-/4.0$ | No Emulsion |
| F | *$O_{3/2}Si(CH_2)_3N^+(CH_3)_2C_{18}H_{37}Cl^+/4.0$ | No Emulsion |

*This material was a condensate of $(HO)_3Si(CH_2)_3N^+(CH_3)_2C_{18}H_{37}Cl^-$ which is low molecular weight but insoluble and non-dispersible in the emulsion.

EXAMPLE 19

Emulsifier Concentration. Several emulsions were prepared essentially by the method set forth in Example 1 except the silane was used at 70 weight solids in order to minimize the volume of methanol in the system while reaching the high levels of the silane required to carry out the evaluation. The silane used in this example was $(CH_3O)_3Si(CH_2)_3N^+(CH_3)_2C_{18}H_{37}Cl^-$. A comparison was made against a commercial quaternary compound, Arquad T27W. The formulations can be found in Table XI and the results on Table XII.

TABLE XI

Formulations From Example 19

| Sample | Oil/Gms | Gms H$_2$O | Gms Silane | Gms Arquad | Weight Percent Emulsifier* |
|---|---|---|---|---|---|
| A | PDMS I, 20 cs 588 | 400 | 11.9 | — | 0.5 |
| B | PDMS I, 20 cs 588 | 400 | — | 11.9 | 0.5 |
| C | PDMS I, 20 cs 600 | 380 | 20.0 | — | 2.0 |
| D | PDMS I, 20 cs 600 | 380 | — | 20.0 | 2.0 |
| E | PDMS I, 20 cs 529 | 400 | 71.0 | — | 5.0 |
| F | PDMS I, 20 cs 529 | 400 | — | 71.0 | 5.0 |
| G | PDMS I, 20 cs 460 | 400 | 140.0 | — | 10.0 |
| H | PDMS I, 20 cs 460 | 400 | — | 150.0 | 10.0 |

*Based on weight of H$_2$O, emulsifier and oil.

TABLE XII

Results From Example 19

| Sample | 40° C. Aging Stability | Freeze-Thaw Stability |
|---|---|---|
| A | 2 months | 2 cycles |
| B | 2 months | 0 cycles |
| C | 2 months | 6 cycles |
| D | 2 months | 2 cycles |
| E | 2 months | 6 cycles |
| F | 2 months | 0 cycles |
| G | 2 months | 6 cycles |
| H | 2 months | 6 cycles |

EXAMPLE 20

The viscosity of the emulsions of this invention can be increased by increasing the amount of surfactant. Thus, a benefit to be derived is the ability to make creams andpastes using the surfactants of this invention, without increasing the quantity of immiscible oil in the system. Several emulsions, with increasing quantities of surfactant, were evaluated and compared against Arquad T27W emulsions for this effect. Thus, emulsions were prepared that were 60 weight percent mineral oil in water wherein the amount of silane was increased from sample to sample. The silane used herein was $(CH_3O)_3Si(CH_2)_3N^+(CH_3)_2C_{18}H_{37}Cl^-$. The results were obtained by determining viscosities in a Ubbelohde tube method. The results are reported in centistokes and can be found in Table XIII.

TABLE XIII

Results from Example 20

| Sample | Weight % Silane | Weight % Arquad | Viscosity/cs. |
|---|---|---|---|
| A | — | 2.0 | 132.6 |
| B | 2.0 | — | 1123.9 |
| C | 5.0 | — | 4549.64 |
| D | — | 10.0 | 111.5 |

EXAMPLE 21

Low Foam Emulsifiers. The emulsions formed by the process of this invention have the benefit that they generate low levels of foam during their preparation. To illustrate this benefit, and to compare this property to the prior art emulsifier, Arquad T27W, there were prepared several emulsions and these emulsions were evaluated by the foam test described in the preamble to the examples. The extent of initial foaming and the defoaming of the solution over a period of time, are important, in that, a low initial foam is desirable and in the alternative, if a high initial foam results, the shortest time for abatement of the foam is desirable. Evaluations were made on the original emulsions, as well as water diluted versions, the formulations and results can be found on Tables XIV and XI, respectively. The silane used on this example was $(CH_3O)_3Si(CH_2)_3N^+(CH_3)_2C_{18}H_{37}Cl^-$.

TABLE XIV

Formulations From Example 21

| Sample | Oil/Gms | H$_2$O Gms | Gms Silane | Gms Arquad | % Emulsifier Solids |
|---|---|---|---|---|---|
| A | PDMS I, 20 cs 600 | 380 | 20 | — | 0.8 |
| B | PDMS I, 20 cs 600 | 380 | — | 31.1 | 0.8 |

TABLE XV

Results From Example 21

| Sample | Dilution | Foam in Cm T$_o$ | Foam in Cm T$_1$ |
|---|---|---|---|
| A | None | 6.0 | 0.75 |
| A(i) | 2 ml A/10 ml H$_2$O | 0.5 | 0.1 |
| A(ii) | 2 ml A/100 ml H$_2$O | 0.5 | 0.1 |
| A(iii) | 2 ml A/1000 ml H$_2$O | 0 | 0 |
| B | None | 15.0 | 13.0 |
| B(i) | 2 ml A/10 ml H$_2$O | 2.0 | 0.25 |
| B(ii) | 2 ml A/100 ml H$_2$O | 1.0 | 0.25 |
| B(iii) | 2 ml A/1000 ml H$_2$O | 0.25 | 0.25 |

EXAMPLE 22

An emulsion was prepared using $(CH_3O)_3Si(CH_2)_3N^+(CH_3)(C_{10}H_{21})_2Cl^-$ (52.7 weight % solids in methanol) as the emulsifier silane. Thus, 12 gms of the silane were mixed with 750 gms of distilled water and then 235 gms of mineral oil were added and the entire mixture was emulsified using the Manton-Gaulin set at 4000 psi. A creamy-white emulsion resulted. The emulsion was subjected to 40° C. aging stability testing and easily exceeded thirty days. This emulsion, however, at the level of 0.5 weight percent did not allow freeze-thaw stability.

A second emulsion was prepared using the silane and a more difficult-to-emulsify oil, PDMS II. Thus, 8.0 gms of the silane were mixed with 253 gms of water and then 400 gms of the oil were added and the entire mixture was emulsified as above. The emulsion was a creamy-white emulsion which easily exceeded 30 days in the 40° C. aging stability test. This emulsion, however, also failed the freeze-thaw test.

EXAMPLE 23

An emulsion of this invention using a 76 weight % solids in methanol $(CH_3O)_3Si(CH_2)_3N^+(CH_3)_2C_{18}H_{37}Cl^-$ (Sample B) was compared to an emulsion prepared using $(CH_3O)_3Si(CH_2)_3N^+(CH_3)_2(CH_2)_3NHC(O)(CF_2)_6CF_3Cl^-$ (Sample A).

This compound is described in U.S. Pat. No. 3,700,844, issued Oct. 24, 1972. This compound was prepared by contacting 21.4 gms of methylperfluorooctanoate with 5.1 gms of 3-dimethylaminopropylamine in a round-bottomed, three necked, glass flask which had been equipped with a stirrer, glass plug and a water-cooled condenser. The reaction exothermed and when it abated, the reaction mass was heated to 60° to 80° C. for about one hour. The flask was cooled and there was added 15.0 gms of chloropropyltrimethoxysilane, under nitrogen, and the mixture was heated at 100° C. for 16 hours. A non-aqueous titration for the quaternary nitrogen showed a yield of about 10.5% of the salt. Fifteen gms of methanol was added to the reaction flask, the heat was turned up to 60°-80° C. and a reflux was maintained for 4 hours. Another non-aqueous titration indicated a yield of 13% of the salt. Fifteen gms of dimethylformamide was added to the flask and the reflux continued for an additional 16 hours, the yield of the desired compound was 55%. Emulsions were prepared using these silanes at 4000 psi and the formulations were:

| Sample | Silane/Gms | H$_2$O Gms | Oil/Gms | Result |
|---|---|---|---|---|
| A | A 37 | 363 | PDMS I 50 cs 600 | Creamy-white, smooth |
| B | B 48 | 352 | PDMS I 50 cs 600 | Creamy-white, smooth |

The emulsions were subjected to 40° C. aging and freeze-thaw testing as follows:

| Sample | 40° C. Stability | Freeze-Thaw |
|---|---|---|
| A | passed 30 days | failed one cycle |
| B | passed 30 days | passed six cycles |

It should be noted that the surfactant of U.S. Pat. No. 3,700,844 is considered to be outside the scope of this invention since it contains the amide linkage in its structure. It should be noted that the oil used in this example is considered to be one of the easiest oils to emulsify and stabilize, yet the A sample using the patented silane could not even survive one freeze-thaw cycle, in spite of the fact that it was prepared with a large quantity of the silane.

EXAMPLE 24

The prior art silane of Example 23 was used to prepare an emulsion in which a difficult-to-emulsify oil was used (PDMS II). These emulsions failed one freeze-thaw cycle.

EXAMPLE 25

An emulsion of this invention using $(CH_3O)_3Si(CH_2)_3N^+(CH_3)_2C_{18}H_{37}Cl^+$ (Sample B) as the silane was prepared and compared against a prior art silane prepared according to the disclosure in Canadian Pat. No. 860,936, Examples 2 and 3. Thus, 5.22 gms of 1-(trimethoxysilyl)-2-(mp-chloromethyl)phenylethane; 2.11 gms of triethylamine and 0.74 gms of methanol were sealed in a glass tube and heated for 16 hours at 100° C. in an oven. The compound

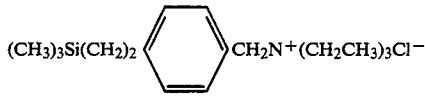

was obtained in a 77% yield as determined by non-aqueous titration.

This material was used to prepare an emulsion (Sample A). The formulations were:

| Sample | Silane/Gms | H$_2$O Gms | Oil/Gms | Result |
|---|---|---|---|---|
| A | A 26 | 374 | PDMS I, 50 cs 600 | Creamy-white emulsion had separated by eight hours |
| B | B 48 | 352 | PDMS I, 50 cs 600 | Creamy-white stable for at least thirty days of 40° C. accelerated aging |

EXAMPLE 26

An emulsion was prepared using a silane which is not part of this invention but is structurally analogous to the silanes of this invention to show that the total carbon substitution on the nitrogen atom of the silane must be at least twelve in order for the silane to work in this invention.

Thus, an attempt to prepare an emulsion was made using 4 gms of $(CH_3O)_3Si(CH_2)_3N^+(CH_3)_2C_8H_{11}Cl^+$, 80 gms of water and 110 gms of mineral oil. The emulsion would not form.

EXAMPLE 27

High solids emulsions were prepared using $(CH_3O)_3Si(CH_2)_3N^+(CH_3)_2C_{18}H_{37}Cl^+$. Thus, 286 gms of a seventy weight percent methanol solution of the silane was mixed with 200 gms of 50 cs PDMS I and 514 gms of water to give an emulsion by two passes through the homogenizer set at 4000 psi. This emulsion contained 20 weight percent of the silane and was stable and very thick and creamy.

A second emulsion was prepared wherein the silane was present at thirty weight percent solids. This emulsion was stable and very thick and it had to be stirred to make it creamy.

A third emulsion was prepared wherein the silane was present at thirty-eight percent solids. This emulsion was extremely thick but could be stirred to render it creamy. It was also stable.

Finally, a fourth emulsion was prepared containing forty weight percent of the silane. This material was very solid and was not capable of being stirred to render it creamy. Instead, it crumbled when stirred. It was also stable.

EXAMPLE 28

The emulsions of Example 27 were repeated except mineral oil was substituted for the PDMS I. At thirth percent by weight of silane, the emulsion formed. At forty percent by weight, the emulsion formed lumps and it never did cream.

EXAMPLE 29

Defining the amount of the oil phase useful in this invention.

Several emulsions were prepared using mineral oil as the oil phase and

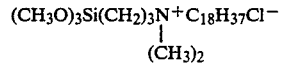

as the cationic silane.

| Sample | Amount of Mineral Oil In Weight Percent | Stability* |
|---|---|---|
| A | 0.1 | Stable |
| B | 0.1 (duplicate) | Stable |
| C | 0.5 | Stable |
| D | 2.5 | Stable |
| E | 84 | Stable |
| F | 84 (duplicate) | Stable |
| G | 88 | Stable |
| H | 88 (duplicate) | Unstable |
| I | 90 | Unstable |
| J | 90 | Unstable |
| K | 96 | Unstable |
| L | 98.5 | Unstable |

*Any change in homogeneity such as creaming, separation, etc.

That which is claimed is

1. Aqueous oil in water emulsion comprising a stable (a) water, (b) a water immiscible liquid, and (c) a cationic silane having the general formula

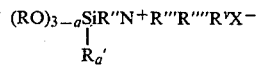

wherein R is an alkyl radical of 1 to 4 carbon atoms or hydrogen; a has a value of 0, 1 or 2; R' is a methyl or ethyl radical; R" is an alkylene group of 1 to 4 carbon atoms; R''', R'''' and R$^v$ are each independently selected from a group consisting of (i) saturated or unsaturated hydrocarbon radicals containing 1 to 18 carbon atoms and (ii) saturated and unsaturated organic radicals consisting of carbon, hydrogen and oxygen; carbon, hydrogen and sulfur, and carbon, hydrogen and nitrogen; the total number of carbon atoms from R''', R'''' and R$^v$ in each of (i) and (ii), must be equal to or greater than twelve carbon atoms and X is selected from a group consisting of chloride, fluoride, bromide, iodide, acetate and tosylate.

2. An aqueous oil in water emulsion as claimed in claim 1 comprising (a) 99.8 to 4.9 weight percent water, (b) 0.1 to 84 weight percent of a water immiscible liquid, and (c) 0.1 to 38 weight percent of a cationic silane, all weights based on the total weight of components (a), (b) and (c).

3. An emulsion as claimed in claim 2 wherein the cationic silane has the general formula

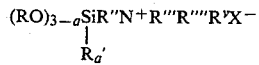

wherein R is an alkyl radical of 1 to 4 carbon atoms or hydrogen; a has a value of 0, 1 or 2; R' is a methyl or ethyl radical; R" is an alkylene group of 1 to 4 carbon atoms; R''', R'''' and R$^v$ are each independently selected from a group consisting of (i) saturated or unsaturated hydrocarbon radicals containing 1 to 18 carbon atoms and (ii) saturated and unsaturated organic radicals consisting of carbon, hydrogen and oxygen; carbon, hydrogen and sulfur; and carbon, hydrogen and nitrogen; the total number of carbon atoms from R''', R'''' and R$^v$ in each of (i) and (ii), must be equal to or greater than twelve carbon atoms and, X is selected from a group consisting of chloride, fluoride, bromide, iodide, acetate and tosylate.

4. An emulsion as claimed in claim 3 wherein the cationic silane has the formula

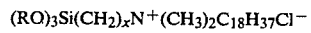

where x is 1 to 4 inclusive.

5. An emulsion as claimed in claim 4 wherein the cationic silane has the formula $(CH_3O)_3Si(CH_2)_2N^+(CH_3)_2C_{18}H_{37}Cl^+$.

6. An emulsion as claimed in claim 3 wherein the cationic silane has the formula

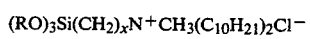

where x is 1 to 4 inclusive.

7. An emulsion as claimed in claim 6 wherein the cationic silane is $(CH_3O)_3Si(CH_2)_3N^+CH_3(C_{10}H_{21})_2Cl^+$.

8. An emulsion as claimed in claim 3 wherein the water immiscible liquid is mineral oil.

9. An emulsion as claimed in claim 3 wherein the water immiscible liquid is a polysiloxane selected from the group consisting of polysiloxanes having the general formula

wherein R' is an alkyl radical of 1 to 3 carbon atoms, phenyl, an alkoxy radical having the formula R''''O—, wherein R'''' is an alkyl radical of 1 to 4 carbon atoms or hydrogen; R" is an alkyl radical of 1 or 2 carbon atoms or the phenyl group; R''' has the same meaning as R"; Q is a substituted or unsubstituted radical composed of carbon and hydrogen, or carbon, hydrogen and oxygen, or carbon, hydrogen and sulfur, or carbon, hydrogen and nitrogen; w has a value of from 1 to 500; z has a value of 1 to 25 and y has a value of 3 to 5.

10. An emulsion as claimed in claim 9 wherein the water immiscible liquid is a polydimethylsiloxane.

11. An emulsion as claimed in claim 9 wherein the water immiscible liquid is a polyphenylmethylsiloxane.

12. An emulsion as claimed in claim 3 wherein the water immiscible liquid is a cyclic siloxane.

13. An emulsion as claimed in claim 12 wherein the cyclic siloxane is a polydimethylcyclosiloxane.

14. An emulsion as claimed in claim 13 wherein the number of dimethylsiloxy units in the cyclosiloxane is 3.

15. An emulsion as claimed in claim 13 wherein the number of dimethylsiloxy units in the cyclosiloxane is 4.

16. An emulsion as claimed in claim 13 wherein the number of dimethylsiloxy units in the cyclosiloxane is 5.

17. An emulsion as claimed in claim 13 wherein the number of dimethylsiloxy units in the cyclosiloxane is 6.

18. An emulsion as claimed in claim 3 wherein the water immiscible liquid is a perfume oil.

19. An emulsion as claimed in claim 3 wherein the water immiscible liquid is a polyglycol.

20. An emulsion as claimed in claim 19 wherein the polyglycol is dipropylene glycol.

21. An emulsion as claimed in claim 19 wherein the polyglycol is glycerol.

22. An emulsion as claimed in claim 19 wherein the polyglycol is polyethylene glycol.

23. An emulsion as claimed in claim 19 wherein the polyglycol is polypropylene glycol.

24. An emulsion as claimed in claim 19 wherein the polyglycol is sorbitol.

25. An emulsion as claimed in claim 3 wherein the water immiscible liquid is a wax.

26. An emulsion as claimed in claim 25 wherein the wax is an animal wax.

27. An emulsion as claimed in claim 26 wherein the animal wax is beeswax.

28. An emulsion as claimed in claim 26 wherein the animal wax is lanolin.

29. An emulsion as claimed in claim 26 wherein the animal wax is spermaceti.

30. An emulsion as claimed in claim 26 wherein the animal wax is whale oil.

31. An emulsion as claimed in claim 25 wherein the wax is a vegetable wax.

32. An emulsion as claimed in claim 31 wherein the wax is candellila.

33. An emulsion as claimed in claim 31 wherein the wax is sugar cane.

34. An emulsion as claimed in claim 31 wherein the wax is jojoba.

35. An emulsion as claimed in claim 25 wherein the wax is a fossil mineral wax.

36. An emulsion as claimed in claim 35 wherein the wax is montan.

37. An emulsion as claimed in claim 35 wherein the wax is ozokerite.

38. An emulsion as claimed in claim 35 wherein the wax is Utah wax.

39. An emulsion as claimed in claim 25 wherein the wax is a hydrocarbon wax.

40. An emulsion as claimed in claim 39 wherein the wax is petrolatum.

41. An emulsion as claimed in claim 39 wherein the wax is paraffin.

42. An emulsion as claimed in claim 39 wherein the wax is microcrystalline.

43. An emulsion as claimed in claim 25 wherein the wax is a synthetic wax.

44. An emulsion as claimed in claim 43 wherein the synthetic wax is gersthofen wax.

45. An emulsion as claimed in claim 43 wherein the synthetic wax is acrowax.

46. An emulsion as claimed in claim 43 wherein the synthetic wax is opalwax.

47. An emulsion as claimed in claim 43 wherein the synthetic wax is cardis.

48. An emulsion as claimed in claim 43 wherein the synthetic wax is Carbowax.

49. An emulsion as claimed in claim 3 wherein the water immiscible liquid is a fatty acid.

50. An emulsion as claimed in claim 49 wherein the fatty acid is stearic acid.

51. An emulsion as claimed in claim 49 wherein the fatty acid is oleic acid.

52. An emulsion as claimed in claim 49 wherein the fatty acid is myristic acid.

53. An emulsion as claimed in claim 3 wherein the water immiscible liquid is a fatty acid derivative.

54. An emulsion as claimed in claim 53 wherein the fatty acid derivative is an ester.

55. An emulsion as claimed in claim 54 wherein the fatty acid ester is a monoester of polyhydric alconol ester.

56. An emulsion as claimed in claim 55 wherein the mono alcohol ester is the methyl ester.

57. An emulsion as claimed in claim 56 wherein the methyl ester is methyl myristate.

58. An emulsion as claimed in claim 56 wherein the methyl ester is methyl stearate.

59. An emulsion as claimed in claim 3 wherein the water immiscible liquid is a fatty alcohol.

60. An emulsion as claimed in claim 59 wherein the fatty alcohol is lauryl alcohol.

61. An emulsion as claimed in claim 59 wherein the fatty alcohol is myristyl alcohol.

62. An emulsion as claimed in claim 59 wherein the fatty alcohol is cetyl alcohol.

63. An emulsion as claimed in claim 59 wherein the fatty alcohol is oleyl alcohol.

64. An emulsion as claimed in claim 59 wherein the fatty alcohol is stearyl alcohol.

65. An emulsion as claimed in claim 3 wherein the water immiscible liquid is a common organic solvent.

66. An emulsion as claimed in claim 65 wherein the common organic solvent is Stoddard solvent.

67. An emulsion as claimed in claim 65 wherein the common organic solvent is Chlorothene.

68. An emulsion as claimed in claim 65 wherein the common organic solvent is octanol.

69. An emulsion as claimed in claim 3 wherein the water immiscible liquid is an antibiotic.

70. An emulsion as claimed in claim 69 wherein the antibiotic is erythromycin.

71. An emulsion as claimed in claim 69 wherein the antibiotic is acromycin.

72. An emulsion as claimed in claim 3 wherein the water immiscible liquid is a vegetable oil.

73. An emulsion as claimed in claim 72 wherein the vegetable oil is peanut oil.

74. An emulsion as claimed in claim 72 wherein the vegetable oil is sesame oil.

75. An emulsion as claimed in claim 72 wherein there is also present an antibiotic.

76. An emulsion as claimed in claim 75 wherein the antibiotic is erythromycin.

77. An emulsion as claimed in claim 75 wherein the antibiotic is acromycin.

78. A medicament when formulated using the emulsion of claim 3.

79. A personal care product when formulated using the emulsion of claim 3.

80. A household product containing the emulsion of claim 3.

* * * * *